US008266626B2

(12) United States Patent
Fellenstein et al.

(10) Patent No.: US 8,266,626 B2
(45) Date of Patent: *Sep. 11, 2012

(54) APPARATUS, METHODS, AND COMPUTER PROGRAMS FOR IDENTIFYING OR MANAGING VULNERABILITIES WITHIN A DATA PROCESSING NETWORK

(75) Inventors: Craig William Fellenstein, Brookfield, CT (US); Rick Allen Hamilton, II, Charlottesville, VA (US); Joshy Joseph, Poughkeepsie, NY (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 849 days.

This patent is subject to a terminal disclaimer.

(21) Appl. No.: 12/182,104

(22) Filed: Jul. 29, 2008

(65) Prior Publication Data

US 2008/0289017 A1 Nov. 20, 2008

Related U.S. Application Data

(63) Continuation of application No. 10/865,700, filed on Jun. 10, 2004, now Pat. No. 7,441,243.

(51) Int. Cl.
*G06F 9/46* (2006.01)
*G06F 15/16* (2006.01)
*G06F 15/173* (2006.01)
*G06F 11/00* (2006.01)

(52) U.S. Cl. ........ 718/104; 709/201; 709/203; 709/223; 709/226; 714/1; 714/2

(58) Field of Classification Search .................... 718/104
See application file for complete search history.

(56) References Cited

U.S. PATENT DOCUMENTS

| 3,593,300 | A | 7/1971 | Driscoll, Jr. et al. |
| 6,353,846 | B1 | 3/2002 | Fleeson |
| 6,480,879 | B1 | 11/2002 | Zinky |
| 6,842,899 | B2 | 1/2005 | Moody et al. |
| 6,963,847 | B1 * | 11/2005 | Kennedy et al. ............ 705/7.29 |
| 7,185,046 | B2 * | 2/2007 | Ferstl et al. ................. 709/201 |
| 7,340,654 | B2 * | 3/2008 | Bigagli et al. ............... 714/47.2 |

(Continued)

OTHER PUBLICATIONS

Foster, I., Kesselman, C., Tuecke, S., "The Anatomy of the Grid: Enabling Scalable Virtual Organizations," The International Journal of High Performance Computing Applications, vol. 15, No. 3, Fall 2001, pp. 200-222. Joseph, Joshy, et al., "Grid Computing," Prentice Hall Professional Technical Reference, Upper Saddle River, New Jersey 07458, 2004. See, for example, pp. 47-57, 123, 156-157, 204-206, and 329.

*Primary Examiner* — Jennifer To
(74) *Attorney, Agent, or Firm* — Anthony V S England; Joseph P. Lalley (57) ABSTRACT

A system, method, and service associated with a computing grid or a virtual organization include a request for proposal (RFP) generator, where the RFP describes a data processing task. The RFP is provided to multiple resource providers via the computing grid where each of the resource providers is potentially suitable for performing the data processing task on behalf of the resource consumer. An RFP response processor receives and evaluates RFP responses generated by one or more of the resource providers. An exception processor accessible to the RFP response processor evaluates any exception in the RFP to determine if the exception disqualifies the RFP response. The exceptions may include, for example, job time limit exceptions, resource requirement exceptions, hardware/software platform requirement exceptions and others. Exception rules may be defined to guide the evaluation of the exception.

16 Claims, 4 Drawing Sheets

U.S. PATENT DOCUMENTS

| | | | |
|---|---|---|---|
| 7,395,536 B2 * | 7/2008 | Verbeke et al. | 718/100 |
| 7,631,069 B2 * | 12/2009 | Bozak et al. | 709/224 |
| 7,640,547 B2 * | 12/2009 | Neiman et al. | 718/104 |
| 2002/0032716 A1 | 3/2002 | Nagato | |
| 2003/0154112 A1 * | 8/2003 | Neiman et al. | 705/5 |
| 2004/0044718 A1 * | 3/2004 | Ferstl et al. | 709/200 |
| 2005/0005272 A1 | 1/2005 | Moody et al. | |
| 2005/0273511 A1 * | 12/2005 | Ferreira de Andrade et al. | 709/227 |

* cited by examiner

APPARATUS, METHODS, AND COMPUTER PROGRAMS FOR IDENTIFYING OR MANAGING VULNERABILITIES WITHIN A DATA PROCESSING NETWORK

CROSS-REFERENCE TO RELATED APPLICATION

This application is a continuation of U.S. patent application Ser. No. 10/865,700, filed Jun. 10, 2004 and entitled, "EXCEPTION HANDLING IN THE PROCESSING OF PROPOSAL REQUESTS IN A GRID COMPUTING ENVIRONMENT, which issued as U.S. Pat. No. 7,441,243, dated Oct. 21, 2008. The Applicants hereby claim the benefit of this U.S. patent application under 35 U.S.C. §120. The entire content of this U.S. patent application is incorporated herein by this reference.

BACKGROUND

1. Field of the Present Invention

The present invention is in the field of grid computing and more particularly, exception processing in grid computing environments.

2. History of Related Art

Grid computing refers generally to a computation network including tools and protocols for coordinated resource sharing and problem solving among pooled assets. These pooled assets, sometimes referred to as virtual organizations, can be connected to a local network or distributed across the globe. A virtual organization is typically characterized as heterogeneous (perhaps including PCs, servers, mainframes, and/or supercomputers), pseudo-autonomous (a given grid could potentially access resources in different organizations), and temporary. Gird computing is described in a variety of publications including, for example, I. Foster et al., *The Anatomy of the Grid, Enabling Scalable Virtual Organizations*, Intl. J. of Supercomputing Applications and High Performance Computing (Fall 2001).

Automated systems are being developed to make grid computing a cost effective and efficient part of everyday computing. One application of particular interest for information technology managers is the concept of on-demand grid computing in which a service requester specifies a data processing task and solicits bids from multiple providers that are part of a particular grid. Within this disclosure, the term "Request for Proposal" (RFP) refers to the mechanism by which a resource requestor (consumer or enterprise) makes known its need for data processing resources and RFP responses refer to the responses generated by grid vendors or resource providers.

Because grid computing is an emerging field, many aspects of grid computing are, at present, rudimentary. Currently, manual inspection of each RFP response is required prior to a purchase decision. In addition, if a particular RFP response contains one or more exceptions, an administrator would have to process each of the exceptions to determine if the RFP response is otherwise eligible for consideration. If, for example, an RFP specifies that a particular task must be completed in 24 hours and an RFP response indicates an estimated completion time of 28 hours, an administrator would be required to determine if the RFP response should be considered or discarded. It would be desirable to implement a gird computing environment in which RFP responses and, specifically, exceptions contained within RFP response, were processed automatically.

SUMMARY OF THE INVENTION

The objective identified above is addressed in the present invention by a system, method, and service associated with a computing grid or a virtual organization that include a request for proposal (RFP) generator, where the generator produces an RFP that describes a data processing task. The RFP is provided to multiple resource providers via the computing grid where each of the resource providers is potentially suitable for performing the data processing task on behalf of the resource consumer. An RFP response processor receives and evaluates RFP responses generated by one or more of the resource providers. An exception processor accessible to the RFP response processor evaluates any exception in the RFP to determine if the exception disqualifies the RFP response. The exceptions may include, for example, job time limit exceptions, resource requirement exceptions, hardware/software platform requirement exceptions and others. Exception rules may be defined to guide the evaluation of the exception.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention provides a mechanism for automating the RFP process in a computing grid environment. More specifically, the invention is directed to automating the handling and processing of exception conditions in RFP responses. When a grid enabled service provider responds to an RFP, the response may include one or more conditions that are non-compliant with RFP requirements or parameters. The present invention defines a mechanism for automating the handling of such exceptions.

A fundamental feature of the computing grid concept is coordinated resource sharing and problem solving in dynamic, multi-institutional virtual organizations. In this context, sharing refers not so much to file exchange but rather to direct access to computers, software, data, and other resources, as is required by a variety of collaborative problem-solving and resource-brokering strategies that are emerging. This computing grid sharing is highly controlled, with resource providers and consumers defining what is shared, who is allowed to share, and the conditions under which sharing occurs. A set of individuals and/or institutions defined by such sharing rules form what is referred to as a virtual organization (VO).

Figure 1:
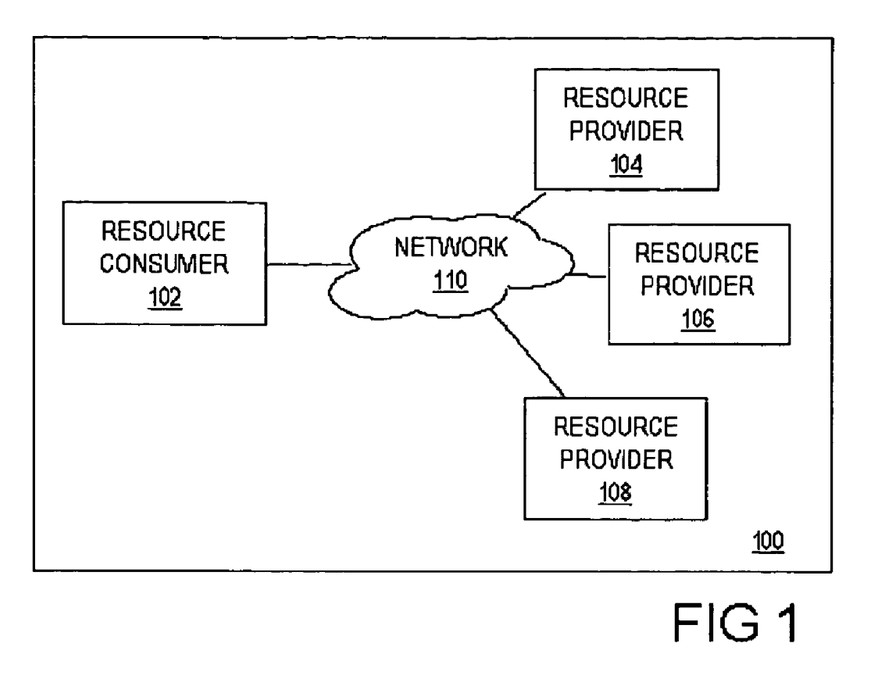
FIG. 1 is a block diagram of selected elements of a computing grid or virtual organization.
Figure 2:
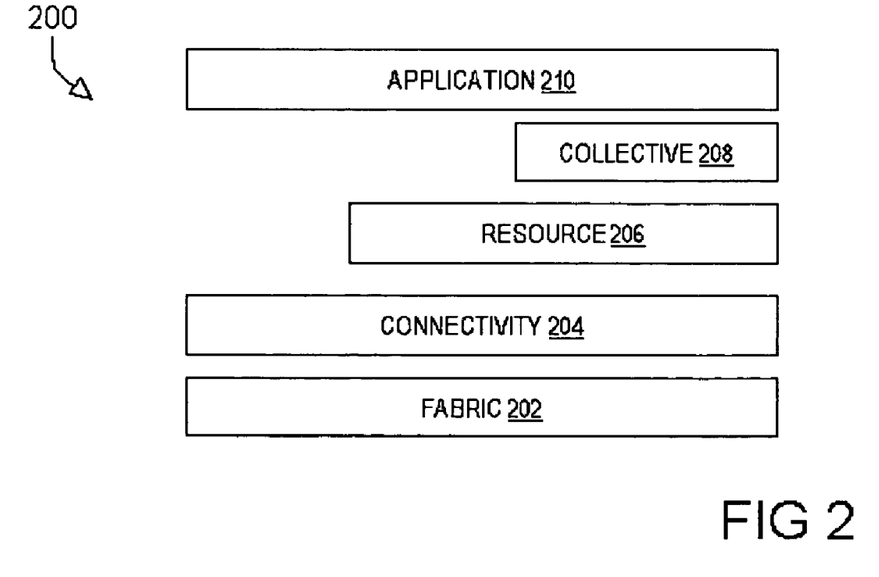
FIG. 2 illustrates selected elements of a component system of the computing grid depicted in FIG. 1.

Referring to FIG. 1 and FIG. 2, a computing grid 100 (also referred to herein as VO 100) is depicted as including a resource consumer 102 and a set of resource providers 104 through 108. Resource consumer 102 is connected to each of the resource providers 104-108 via a network 110. Each of the entities in VO 100 is implemented in compliance with a grid computing architectural model.

FIG. 2 illustrates selected components of a system 200 that is part of VO 100 as depicted in FIG. 1. The elements of system 200 as depicted in FIG. 2 correspond to like-named elements of the grid computing architectural model, in compliance with which system 200 is implemented. Thus, system 200 as depicted in FIG. 2 may represent either a resource consumer such as resource consumer 102 or a resource provider such as resource provider 104, 106, and 108 of FIG. 1. The elements of FIG. 2 are most likely implemented as computer code or computer software stored on a computer accessible medium such as a hard disk, system memory, or other form of persistent or dynamic storage. These architectural components are layered in a manner analogous to the manner in which Internet protocol components are layered, but include components (such as the resource and collective layers described below) that are beyond the scope of conventional Internet client-server models.

At the base of the grid computing architectural model is the fabric layer 202. Fabric layer 202 enables shared access to resources such as computational resources (e.g., CPU cycles), storage resources, network resources, database resources, and so forth. Fabric components implement the local, resource-specific operations that occur on specific resources as a result of sharing operations at higher levels. VO resources preferably implement enquiry mechanisms enabling grid entities to discover a resource's capabilities and state as well as management mechanisms that enable at least some control over the quality of service delivered by an entity.

Connectivity layer 204 defines communication and authentication protocols required for grid-specific network transactions. Communication protocols enable the exchange of data between fabric layer resources. Authentication protocols build on communication services to provide secure mechanisms for verifying the identity of users and resources. Communication requirements include transport, routing, and naming. These protocols may incorporate or leverage elements of the TCP/IP protocol stack, such as the IP, TCP, and DNS layers of the Internet layered protocol architecture. In addition to providing a communication mechanism, the TCP/IP protocol suite defines a number of security standards developed that are applicable in the grid computing environment.

Authentication mechanisms implemented within VO 100 preferably include "single sign on" mechanisms and "delegation" mechanisms. Single sign on refers to capabilities enabling a user to log on or otherwise authenticate just once and then have access to multiple resources within the computing grid. Delegation refers to the ability of a user to authorize a program to execute on behalf of the user so that the program is authorized to access resources to which the user has access.

Resource layer 206 extends the communication and authentication protocols of connectivity layer 204 to define protocols for the secure negotiation, initiation, monitoring, control, accounting, and payment of sharing operations on individual resources. Resource layer objects call fabric layer functions to access and control local resources. Resource layer 206 encompasses information protocols and management protocols.

Information protocols provide the mechanisms by which a resource consumer can obtain information about the state of a resource including, for example, the resource's configuration, loading, and cost. Management protocols are used to negotiate access to a shared resource, specifying, for example, resource requirements such as quality of service and the operation(s) to be performed, such as process creation, or data access. Management protocols must ensure that the requested protocol operations are consistent with the policy under which the resource is to be shared. Management protocols address considerations including accounting, payment, and operation status monitoring.

Whereas resource layer 206 is focused on interactions with a single grid resource, collective layer 208 encompasses protocols and services not associated with any specific resource but rather are global in nature and capture interactions across collections of resources. Collective layer services include, as just a few examples, discovery services, allocation/scheduling services, and software discovery services. Directory services allow VO entities to discover the existence and/or properties of VO resources. A directory service may allow its users to query for resources by name and/or by attributes such as type, availability, or load. Co-allocation, scheduling, and brokering services allow VO participants to request the allocation of one or more resources for a specific purpose and the scheduling of tasks on the appropriate resources. Software discovery services discover and select the best software implementation and execution platform based on the parameters of the problem being solved.

Application layer 210 includes the user applications that operate within a VO environment. Applications are constructed by calling upon services defined at the lower layers. At each layer, well-defined protocols provide access to some useful service such as resource management, data access, and resource discovery.

Is it important to distinguish VO 100 from conventional distributed computing implementations, such as those provided under world wide web (Web) and application service provider (ASP) models. Generally, conventional distributed computing approaches do not provide a general resource-sharing framework that addresses VO requirements. While the prevalence of Web technologies (e.g., TCP/IP, HTTP) and languages (e.g., HTML and XML) makes them attractive as a platform for constructing VO systems and applications, they lack features required for the richer interaction models that occur in VOs. For example, conventional Web browsers typically use Transport Layer Security (TLS) for authentication, but do not support single sign-on or delegation.

Conventional ASP implementations, similarly, do not address the specific requirements of general purpose VO implementations. For example, ASPs tend to handle security using Virtual Private Network (VPN) technology to extend a customer's intranet to encompass resources operated by the ASP on the customer's behalf. The use of VPN, unfortunately, makes it typically impossible for an ASP application to access data located on storage managed by a separate provider. Resource sharing across providers is virtually nonexistent in the hosting industry. Unlike a VO, a VPN cannot extend dynamically to encompass other resources and does not provide resource providers with any control of when and whether to share its resources.

One computing grid application of importance is on-demand computational resource acquisition. On-demand computing, as the term is used herein, refers to a resource consumer's ability to identify or locate grid-provided computational resources in real time and negotiate with resource providers for the use of such resources. In a typical on-demand scenario, resource consumer 102 (FIG. 1) wants to obtain computational resources to perform a specific data processing task. For purposes of this disclosure, a data processing task may include data storage, Resource consumer 102 is typically constrained by one or more parameters such as the time frame in which the task must be completed and the cost that the resource consumer is willing or able to pay. Within a grid computing environment as described herein, resource consumer 102 is configured to seek out the resource provider best able to accommodate its needs by means of a virtualized, grid-based bidding mechanism. Aspects of an exemplary grid-based bidding mechanisms are disclosed in a U.S. Patent Application entitled "Computer implemented method for automatically controlling selection of a grid provider for a grid job," filed Jan. 12, 2005, application Ser. No. 10/034,335), which issued as U.S. Pat. No. 7,472,079 on Dec. 30, 2008, and is incorporated by reference herein (referred to herein as the "RFP Response application").

The RFP Response application identifies various fields or parameters that might be included within a virtual RFP submission and response system. These parameters include Capacity Upgrade on Demand (CUoD) eligibility, job time limits, resource limits, job completion requirements, grid alliances including any special pricing, job cost limit, software platform class, hardware platform class, data access/transport mechanism, data size, security requirements, and performance/latency requirements. In addition, the RFP and response may negotiate Quality of Service guarantees and Service Level Agreements, estimated job run times on the preferred platform, any applicable grid "sell off" or outsourcing policy, the RFP response time, and the job priority.

Figure 3:
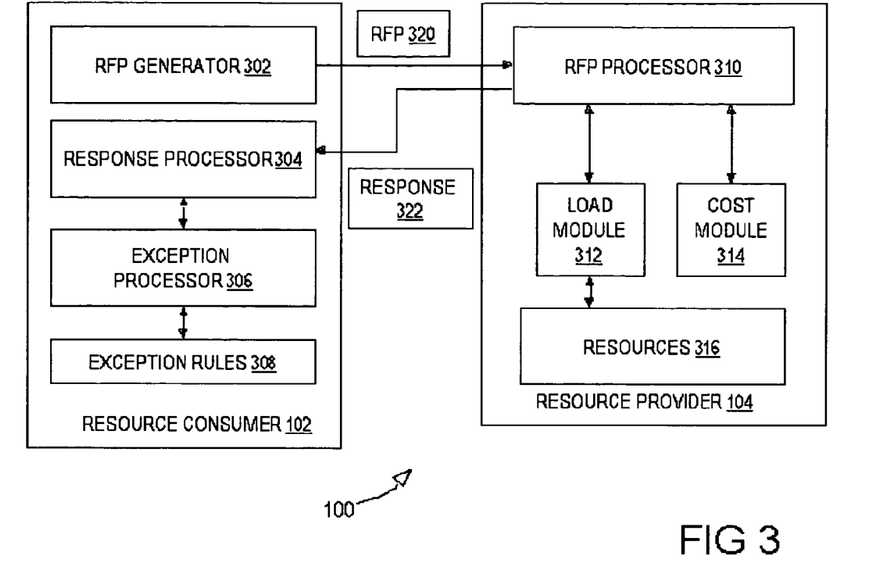
FIG. 3 is a block diagram of selected elements of computing grid components suitable for participating in a grid-based, virtual RFP and RFP response system.

Referring now to FIG. 3, selected elements of computing grid 100 suitable for processing RFP responses generated by resource providers are depicted. The elements depicted in FIG. 3 may be partially or entirely implemented as a set or sequence of computer executable instructions (i.e., computer software) stored on a volatile or persistent computer readable medium. In the depicted embodiment of computing grid 100, resource consumer 102 includes an RFP generator 302, a response processor 304, and an exception processor 306. The resource provider 104 includes an RFP processor 310 configured to receive an RFP 320 generated by RFP generator 302. RFP processor 310 has access to a load module 312 and a cost module 314 that facilitate the preparation of an appropriate RFP response 322. Specifically, RFP processor 310 is configured to extract selected workload and job cost information from RFP 320 and provide the information to load module 312 and cost module 314 respectively.

Workload module 312 is shown as having access to one or more computational resources 316 and is configured to determine the amount of workload required to process the task specified in RFP 320. Workload module 312 returns the determined load calculation to RFP processor 310, which forwards the workload information to cost module 314 along with cost information within RFP 320. Cost module 314 then determines a cost associated with performing the specified task and returns the cost information to RFP processor 310. RFP processor 310 sends a response 322 to resource consumer 102. The response 322 may be thought of as the resource provider's bid. In cases where RFP processor 310 determines that resource provider cannot comply with requirements specified in RFP 320, RFP processor 310 may return a "no bid" to resource consumer 102.

The present invention recognizes that the response 322 generated by resource provider 104 may not fully comply with values specified in RFP 320. Addressing this problem, the present invention provides a flexible, rules-based exception processor 306 for handling exceptions found in RFP responses 322. Exception processor 306 extends the functionality of computing grid 100 by enabling evaluation of non-compliant RFP responses. In some cases, the resource consumer may wish to consider RFP responses despite one or more exceptions contained in those bids. If, for example, an RFP response indicates a time to complete a specified task at a specified price slightly exceeding a time limit expressed in the RFP, the resource consumer may wish to waive the specified time limit requirement in the absence of a more competitive RFP response.

Exception processor 306 according to the present invention is preferably configured to detect one or more exceptions contained in an RFP response 322 received from a resource provider in response to an RFP issued by the resource consumer. In response to detecting one or more exceptions in an RFP response, exception processor 306 is enabled to access a set of dynamically adjustable exception rules 308 to determine whether the RFP response should be further evaluated or simply disqualified. In the event that exception processor 306 locates no rules within exception rules 308 associated with a particular exception, exception processor may disqualify the RFP response or, alternatively, alert an administrator and give the administrator an opportunity to define a rule for the particular exception. If exception processor 306 determines that none of the exceptions contained in an RFP response are fatal, exception processor 306 may return the RFP to response processor 304.

Examples of the types of processing that may be performed by exception processor 306 will now be described to illustrate the exception processing concept. It should be appreciated that the examples provided are not meant to be exhaustive and that all forms of exception processing in the RFP evaluation/selection process are within the scope of the present invention. Specific exception processing cases may evaluate exceptions associated with job time limits, resource limits, job completion requirements, and hardware and/or software platform classes. In the case of job time limits for example, an RFP 320 may specify a job time limit. A time limit of 120, for example, may restrict job run time to 120 minutes thereby indicating that the resource consumer needs the job completed within that time period. The job time limit may be associated with a resource consumer deadline or, in a case where grid services are billed based on time on the grid, a job time limit may reflect a budgetary consideration.

Exception processor 306 may include job time limit exception rules that permit the processor to evaluate job time limit exceptions contained in an RFP response. The RFP response may contain LOADtotal and RESOURCEtotal parameters indicating the estimated amount of workload associated with a task specified in a particular RFP as well as the amount of resources available to process the task. The LOADtotal, for example, may be expressed in terms of CPU cycles, bytes, or some other resource parameter while the RESOURCEtotal may be expressed in terms of available CPU cycles/hour or bytes/hour. In such a case, the exception processor 306 and exception rules 308 may include job time limit exception handling rules that permit exception processor 306 to evaluate an RFP response when the response does not comply with the RFP-specified job time limit. Imagine, as an example, that a resource provider generates an RFP response in which it specifies a LOADtotal and a RESOURCEtotal. Response processor 304 determines a value for TIMEtotal (the total time required for the resource provider to process the job) by dividing the LOADtotal by the RESOURCEtotal. Exception processor 306, in conjunction with exception rules 308, may then determine if the RFP response contains a job time exception by comparing the determined value of TIMEtotal with a TIMElimit value specified in the RFP. If exception processor 306 detects a job time limit exception (i.e., TIMEtotal>TIMElimit) it may set an exception condition (e.g., TIMEtotal=−1). Based on the rules in exception rules 308, exception processor 306 may then disqualify the RFP response or further evaluate the RFP response. Exception rules 308 may include, for example, a rule for job time limit exceptions by comparing the amount of time needed by the resource provider to complete the job to the amount of time specified by the resource consumer in the RFP. An example of such a rule might be:

```
[if] TIMEtotal = −1 [then] TIMEexception={TIMElimit /
(LOADtotal/RESOURCEtotal));
[if] TIMEexception >= .90 [then] TIMEtotal={TIMElimit /
TIMEexception} {exit 0} [elseif]
    TIMEexception >= .85 [and if] LOWCOSTyes [then]
    TIMEtotal={TIMElimit / TIMEexception} {exit 0} [else]
    TIMEtotal = −1.
```

In this case, exception processor 306 modifies waives or forgives job time limit exceptions when the indicated amount of time required by the resource provider is within 10% of the time limit specified by the resource consumer or when the indicated amount of time required is within 15% of the time limit and the resource provider is also the lowest cost provider (as indicated by the Boolean variable LOWCOSTyes). Otherwise, the RFP response is disqualified.

This example illustrates the ability of the exception handling mechanism to determine whether to disqualify an exception condition based on the value of other parameters in the RFP response. In addition, example also illustrates the potential for intelligent and flexible, rules-based evaluation of RFP responses containing exceptions. Exception handling is this case is based on multiple parameters (e.g., time and cost) permitting powerful capabilities to evaluate RFP responses without administrative intervention. Only in the case when an exception is not addressed by an exception handling rule will an administrator be contacted. As dynamic exception rules 308 grows with time, it is contemplated that the number of RFP responses requiring administrative intervention will approach zero asymptotically.

A second example of exception handling involves evaluation of resource limit exceptions. In this example, an RFP may indicate a value (e.g., RESOURCElimit) limiting the amount of resources to be allocated to the specified task. Resource consumers may want to specify resource limits, for example, in the case of service providers that charge based on the amount of resources allocated to a task rather than the time required to complete the task. Using the RESOURCElimit parameter, an RFP may constrain the amount of resources to be dedicated to a job. In another instance, a resource consumer may wish to indicate a minimum level of resources to be dedicated to its task. Specifying a minimum level of dedicated resources might be desirable for service providers that charge based on the amount of time on the grid. If the level of resources to be allocated to a job is insufficient, the expense associated with performing the specified task might exceed the resource consumer's budget. Whether an RFP specifies an minimum resource limit value, a maximum resource limit value, or both, the resource providers may respond to the RFP by indicating the level of resources the resource provider is able to provide. If a response to an RFP containing a resource limit constraint does not comply with the resource limit specified in the RFP, response processor 304 (FIG. 2), in conjunction with one or more resource limit rules in exception rules 308, may evaluate the exception condition to determine whether to reject the RFP response or to reject. A resource limit rule in exception rules 308 might decide, for example, to consider an RFP response with a non-compliant value for resource limits if the response is otherwise compliant and the resource limit parameter specified in the response is within 75% of the resource limit required by the RFP.

Additional examples of RFP response parameters and exceptions that may be contemplated within response processor include task completion requirements and hardware and/or software platform requirements. A task completion requirement, contrasted with job time limit requirements, may specify a date and time when the task must be completed, including any verification of the task that is part of the RFP. Thus, whereas a job time limit requirement might constrain how much computational time is expended on a job, a task completion requirement might indicate a deadline for completing the job regardless of how much computational resources are expended. In the case of hardware and/or platform requirements, an RFP may specify or indicate a preference for a specific class of hardware platform. The resource provider may compare the requested or specified platform against every platform that the provider has available. If the provider does not have the requested platform available, the resource provider may indicate a different platform or set of platforms that are available. In such cases, the RFP response processor may detect the platform exception and process the RFP response according to appropriate rules. The rules engine 308 might, for example, include information indicating hardware/software platforms that are compatible with a given platform and the response processor may access the compatible platform information to determine if a platform exception should cause an RFP response to be disqualified.

Many other exception relationships are contemplated by the present invention. Parameters specified in an RFP may be determined from other parameters. As an example, a parameter indicating the amount of time required to process a job may be determined by a complex formula involving the amount of data, the platform, the number of records processed, the network-bandwidth needed, and so forth. In such cases, the exception processing may include the capability to evaluate the exception in terms of its component pieces.

Figure 4:
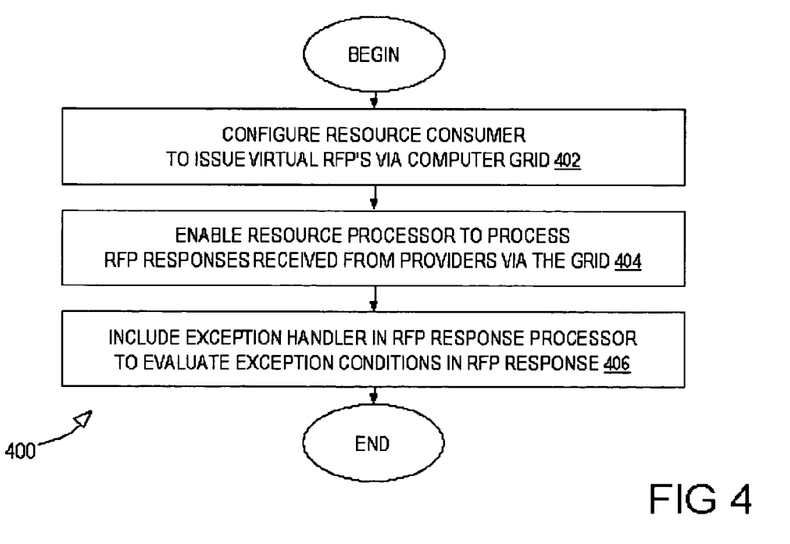
FIG. 4 is a flow diagram of a service for enabling a resource consumer in a computing grid to process RFP responses including evaluating exception conditions in the response.

One embodiment of the invention is implemented as a service provided to a customer that wants to incorporate exception handling into its grid-based RFP system. In this embodiment, selected elements of which are depicted in the flow diagram of FIG. 4, a service 400 may include configuring (block 402) a system to be suitable as a resource consumer within a VO or computing grid and, specifically, configuring the resource consumer to issue virtual RFP's to resource providers on the grid. Service 400 would further include enabling (block 404) a system to process response to virtual RFP's that are received from resource providers via the grid. In the depicted embodiment, service 400 further includes incorporating (block 406) an exception handler, most likely having access to an ordered set of exception rules, to process RFP response containing exceptions and determine whether the response must be disqualified because of the exception or if the response may be considered despite the presence of one or more exceptions. In some cases, blocks 402 and 404 (configuring RFP generation and RFP response handling techniques) may be performed independently of block 406, in which exception handling functionality is incorporated into an existing grid-based brokering system.

One embodiment of the invention is implemented as a set or sequence of computer executable instructions (software code) stored within a computer readable medium that is accessible to data processing system of a resource consumer within a VO or other computing grid. An example of such an embodiment is illustrated in the flow diagram of FIG. 5. The flow diagram represents the functionality of a computer program product 500 that is stored in a computer readable medium.

Figure 5:
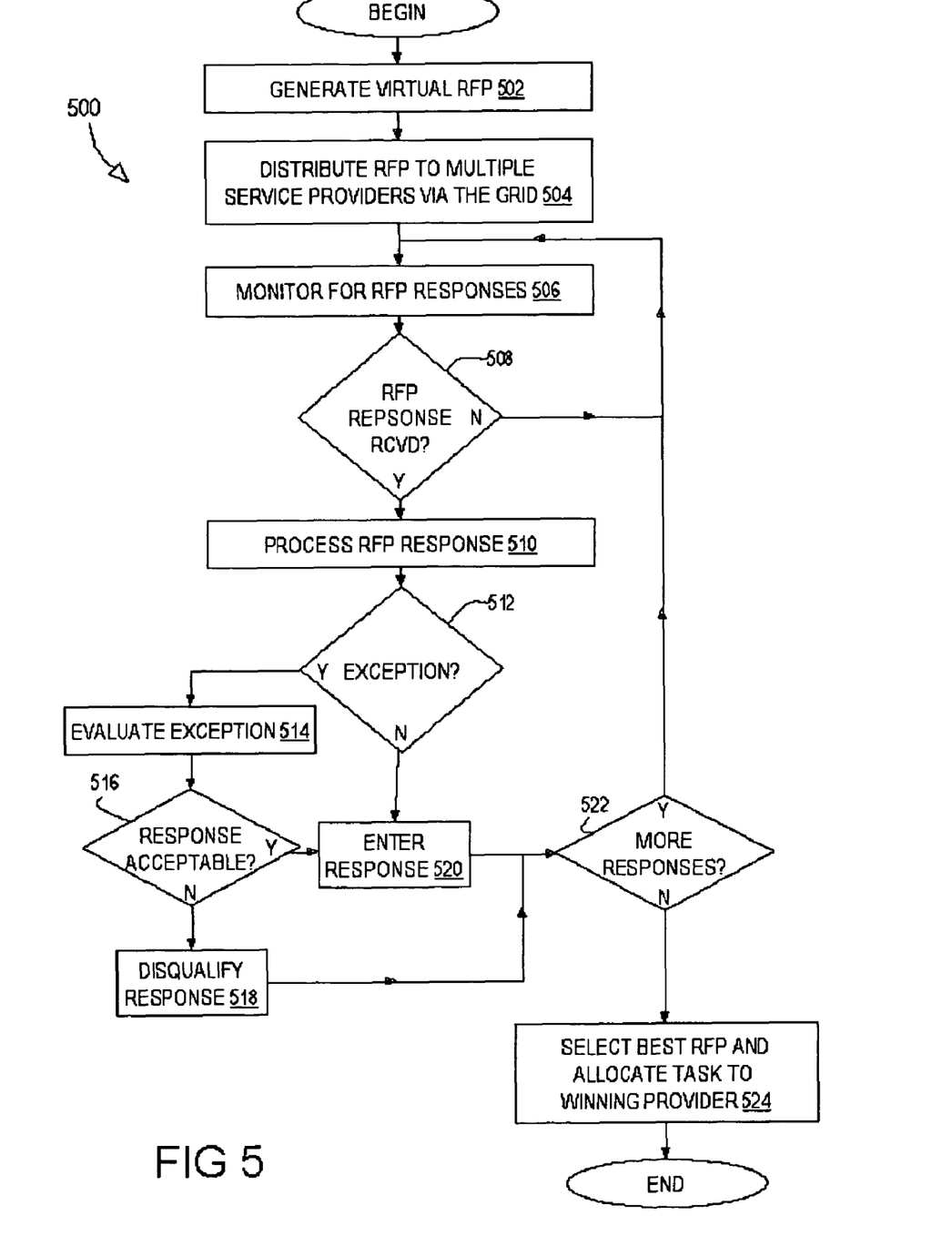
FIG. 5 is a flow diagram of a method of handling exceptions in RFP responses according to one embodiment of the present invention.

In the depicted embodiment, computer program product 500, during execution, enables a data processing system to generate a virtual RFP as depicted in block 502. The virtual RFP is then distributed (block 504) to preferably two or more resource or service providers that form the computing grid or VO. The resource consumer then monitors (block 506) for RFP responses being returned from one or more of the resource providers.

When an RFP response is received (block 508), the response is processed (block 510), most likely by a response processor such as the response processor 304 of FIG. 3. According to the present invention, the response processing performed in block 510 detects the presence of any exception conditions within the RFP response. If the response processor determines (block 512) that an RFP response contains one or more exceptions, each exception is evaluated (block 514) preferably through the use of an exception processor and an associated set of exception rules that are accessible to the response processor. The exception processing evaluates an exception condition to determine if the RFP is acceptable despite the exception condition(s) or whether the RFP response should be disqualified (block 518). If the exception processing determines that the RFP response is should be considered despite the exception condition, the RFP response is entered (block 520) such as by storing the RFP response in a database of acceptable RFP responses. If additional responses are expected (block 522), monitoring for RFP responses is resumed in block 506. If no additional responses are expected, response processing continues by evaluating (block 524) the database of acceptable RFP responses for the RFP response that best meets the needs of the RFP.

Figure 6:
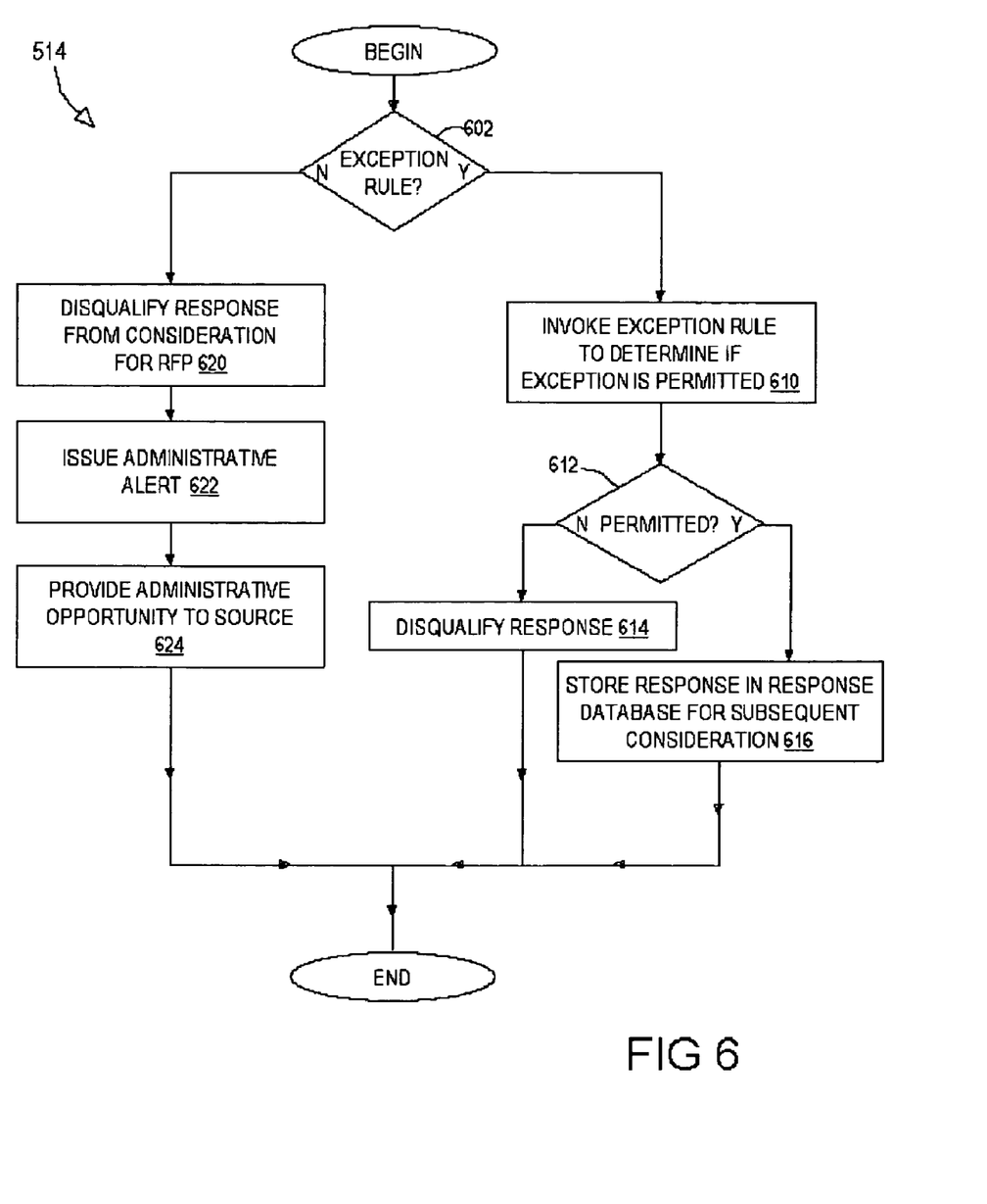
FIG. 6 is a flow diagram illustrating additional detail of an exception handling mechanism of FIG. 5.

Referring to FIG. 6, an embodiment of the exception processing indicated in block 514 of FIG. 5 is depicted. In this embodiment, the exception processing 514 includes determining (block 602) whether exception rules 308 contains a rule corresponding to the exception under consideration. If exception rules 308 does contain a pertinent rule, the rule is invoked (block 610) and used to decide (block 612) whether the exception disqualifies (block 614) the RFP response or whether the exception will be permitted (block 616) (i.e., the exception will be noted but will not ultimately disqualify the RFP response from being selected by the resource consumer).

If exception rules 308 does not contain a rule corresponding to the exception under consideration, the depicted embodiment of exception processing 514 disqualifies (block 620) the RFP response from further consideration and issues (block 622) an administrative alert to inform an administrator of the occurrence of an exception for which no rule exists. In this case, the administrator may be provided (block 624) with the opportunity to edit exception rules 308 to include an exception rule corresponding to the error condition under consideration.

It will be apparent to those skilled in the art having the benefit of this disclosure that the present invention contemplates a mechanism for enabling automated exception processing in the context of a computing grid-based architecture for generating virtual RFPs and for handling responses thereto. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for enabling a resource-consuming computer to perform as a virtual organization resource consumer in a virtual organization, the method comprising:
    sending, by a data processing system, a request for proposal (RFP) to a plurality of resource providers associated with the virtual organization, the RFP being descriptive of a proposed data processing task;
    after sending the RFP, receiving, by the data processing system, one or more RFP responses each associated with a respective resource provider in the virtual organization, the one or more RFP responses each including one or more indicators of estimated data processing task parameters associated with proposed future execution of the proposed data processing task by the respective resource provider on the network;
    detecting, by the data processing system, an exception condition for a selected one of the one or more RFP responses; and
    in response to detecting the exception condition for the selected one of the one or more RFP responses, automatically determining, by the data processing system, whether the exception condition will be waived and thereby enabling the selected one of the one or more RFP responses for acceptance by the resource consumer, wherein detecting the exception condition for the selected one of the one or more RFP responses further comprises:
        computing, by the data processing system, a performance capability measure for the respective resource provider associated with the selected one of the one or more RFP responses, the performance capability measure being calculated from multiple data processing task parameter indicators from the selected one of the one or more RFP responses.

2. The method of claim 1, in which the detecting the exception condition for the selected one of the one or more RFP responses further comprises comparing the computed performance capability measure to a predetermined performance requirement, wherein an exception condition is detected for the selected one of the one or more RFP responses if the comparing indicates the computed performance capability measure is less than a required minimum, greater than a required maximum, or outside a required range.

3. The method of claim 1, further comprising dynamically updating, by the data processing system, a set of rules for determining whether exception conditions will be waived, the dynamic updating performed in response to user handling of a first exception condition after the first exception condition was not waived.

4. The method of claim 1, in which the automatically determining whether the exception condition will be waived is based from at least one of the one or more indicators of estimated data processing task parameters in the one or more RFP responses.

5. The method of claim 4, in which the automatically determining whether the exception condition will be waived is further based on values calculated by the resource-consuming computer from at least one of the one or more indicators of estimated data processing task parameters in the one or more RFP responses.

6. The method of claim 1, further comprising authorizing, by the data processing system, a program to execute on behalf of a user wherein the program is authorized to access resources to which the user has access.

7. The method of claim 1, further comprising:
discovering, by the data processing system, virtual organization resources; and
enabling, by the data processing system, the resource-consuming computer to exchange data with the virtual organization resources and to verify identities of the virtual organization resources.

8. A resource consumer apparatus for use in a computing grid, the apparatus comprising:
a data processing system;
a computer readable tangible storage device having instructions stored thereon the instructions, when executed by the data processing system, perform a method comprising:
sending, by the data processing system, a request for proposal (RFP) to a plurality of resource providers associated with the computing grid, the RFP being descriptive of a proposed data processing task;
after sending the RFP, receiving, by the data processing system, one or more RFP responses each associated with a respective resource provider in the computing grid, the one or more RFP responses each including one or more indicators of estimated data processing task parameters associated with proposed future execution of the proposed data processing task by the respective resource provider;
detecting, by the data processing system, an exception condition for a selected one of the one or more RFP responses; and
in response to detecting an exception condition for the selected RFP response, automatically determining, by the data processing system, whether the exception condition will be waived and thereby enabling the selected one of the one or more RFP responses for acceptance by the resource consumer, wherein detecting the exception condition for the selected RFP response further comprises:
computing, by the data processing system, a performance capability measure for the respective resource provider associated with the selected one of the one or more RFP responses, the performance capability measure being calculated from multiple data processing task parameter indicators from the selected one of the one or more RFP responses.

9. The apparatus of claim 8, wherein the method further comprises discovering, by the data processing system, resources of the resource providers.

10. The apparatus of claim 8, wherein the method further comprises verifying, by the data processing system, identities of computer grid resources.

11. The apparatus of claim 8, wherein the method further comprises accessing, by the data processing system, an exception rules database containing rules for handling specified exceptions in RFP responses.

12. The apparatus of claim 11, wherein the exception rules database includes exception rules for handling job time exceptions, resource limitation exceptions, and hardware or software platform exceptions in the RFP response.

13. A computer readable tangible storage device having instructions stored thereon for execution by a data processing system to delegate a data processing task, wherein the instructions, when executed by the data processing system, perform a method comprising:
sending, by the data processing system, a request for proposal (RFP) to a plurality of resource providers communicatively associated with the data processing system, the RFP being descriptive of a proposed data processing task;
after sending the RFP, receiving, by the data processing system, one or more RFP responses each associated with a respective resource provider in a virtual organization, the one or more RFP responses each including one or more indicators of estimated data processing task parameters associated with proposed future execution of the proposed data processing task by the respective resource provider;
detecting, by the data processing system, an exception condition for a selected one of the one or more RFP responses;
in response to detecting, by the data processing system, an exception condition for a selected one of the one or more RFP responses, automatically determining whether the exception condition will be waived and thereby enabling the selected one of the at least one or more RFP responses for acceptance by the resource consumer; and
dynamically updating, by the data processing system, a set of rules for determining whether exception conditions will be waived, wherein the dynamically updating is performed in response to user handling of a first exception condition after the first exception condition was not waived.

14. The computer readable tangible storage device of claim 13, wherein the method further accessing, by the data processing system, a database containing a set of except rules for determining whether exception conditions will be waived, and for determining the existence of a specific exception rule corresponding to the exception condition.

15. The computer readable tangible storage device of claim 13, wherein the method further comprises verifying, by the data processing system, identities of computer grid resources.

16. The computer readable tangible storage of claim 13, wherein the method further enabling, by the data processing system, a user to authorize a program to execute on behalf of the user wherein the program is authorized to access resources to which the user has access.

* * * * *